(12) United States Patent
Noggle et al.

(10) Patent No.: US 6,942,432 B2
(45) Date of Patent: Sep. 13, 2005

(54) MILLING CUTTER AND INSERT-CARRYING CARTRIDGE FOR USE THEREIN

(75) Inventors: Kenneth G. Noggle, West Bloomfield, MI (US); Lee Reiterman, Rochester Hills, MI (US)

(73) Assignee: Sandvik Intellectual Property AB, Sandviken (SE)

( * ) Notice: Subject to any disclaimer, the term of this patent is extended or adjusted under 35 U.S.C. 154(b) by 174 days.

(21) Appl. No.: 10/400,521

(22) Filed: Mar. 28, 2003

(65) Prior Publication Data

US 2004/0191008 A1 Sep. 30, 2004

(51) Int. Cl.[7] ............................................... B23C 5/24
(52) U.S. Cl. ........................................ 407/40; 407/46
(58) Field of Search .............................. 407/46, 34, 40, 407/101

(56) References Cited

U.S. PATENT DOCUMENTS

| | | | |
|---|---|---|---|
| 650,013 A | | 5/1900 | Huther |
| 4,040,156 A | * | 8/1977 | Tack .......................... 407/44 |
| 4,097,174 A | * | 6/1978 | Heinlein ...................... 407/46 |
| 4,547,100 A | * | 10/1985 | Naccarato et al. ............ 407/39 |

(Continued)

Primary Examiner—Derris H. Banks
Assistant Examiner—Sara Addisu
(74) Attorney, Agent, or Firm—Ronald J. Gradziecki; Drinker, Biddle & Reath

(57) ABSTRACT

A milling tool includes a milling body and a plurality of insert-carrying cartridges mounted in the milling body. Each cartridge includes front and rear side surfaces which oppose leading and trailing walls of a pocket formed in the milling body. The cartridge also includes inner and outer flank surfaces which interconnect the front and rear side surfaces. The body includes a slot which opens into the front side surface at a location intermediate the ends of the cartridge, to divide the body into a rigid base portion and an expandable portion. The base portion has a seat for a cutting insert. A threaded hole is formed in the slot intermediate the slot ends to receive a threaded wedge screw. Tightening of the screw causes the expandable portion to be expanded into contact with the leading wall of the pocket and thereby push the base portion into tight contact with the trailing wall of the pocket. Accordingly, the cartridge is secured within the pocket by a tight frictional contact which resists chatter. The cartridge carries an adjusting screw to enable the cartridge to be adjusted in a direction along the axis of rotation of the milling body.

19 Claims, 2 Drawing Sheets

MILLING CUTTER AND INSERT-CARRYING CARTRIDGE FOR USE THEREIN

BACKGROUND OF THE INVENTION

The present invention relates to milling cutters and especially to insert-carrying cartridges usable in milling cutters.

Milling cutters are known which comprise a milling body that is rotatable about an axis and carries a plurality of cutting inserts disposed in circumferentially spaced relationship around an outer periphery of the milling body.

It has been proposed to mount the inserts on holders and secure the holders in place by wedges which are attached to the milling body by screws. However, the wedges tend to become tightly secured and difficult to remove. Also, the pockets formed in the milling body to receive the holders must be enlarged to also receive the wedges. That can reduce the number of inserts that can be mounted on the milling body, as well as weaken the milling body (due to the removal of a greater amount of material to form the pockets).

It has been known to mount cutting inserts in a rotary body by means of self-contained cartridges, i.e, cartridges which carry their own securing mechanism. For example, see U.S. Pat. No. 650,013 and U.S. Pat. No. 4,097,174, each of which discloses a cartridge having an insert seat at the top end thereof and a center slot extending into the bottom and thereof. The slot divides the cartridge into a rigid cutting part and a pair of legs that can be elastically spread apart relative to the cutting part about respective fulcrums by a spreading screw threadedly attached within a hole that extends perpendicularly through the slot. By thus spreading apart the legs, the bottom ends of the legs can be brought into tight contact with respective walls of the cartridge-receiving pocket to frictionally retain the cartridge within the pocket. A shortcoming of that arrangement involves the fact that the engagement between the cartridge and the pocket occurs at essentially two points at the bottom of the cartridge (defined by the legs), leaving the cutting part unsupported and capable of "play", i.e., of moving by an amount equal to the allowable manufacturing tolerances between the cartridge and the pocket. That results in chatter and poor tool life.

Also, the cartridges disclosed in U.S. Pat. Nos. 650,013 and 4,097,174 do not enable the cartridges to be adjusted to change the cutting depth.

Accordingly, it would be desirable to provide an improved insert cartridge.

It would also be desirable to provide such a cartridge which is simple to operate and does not cause the cartridge to be shifted during securement within a pocket.

It would be further desirable to provide such a cartridge which can be easily adjusted.

It would also be desirable to provide a cartridge which is less likely to produce chattering, and which exhibits longer cutter life.

SUMMARY OF THE INVENTION

The present invention relates to a cartridge for a milling cutter, as well as to the milling cutter which carries the cartridge. The cartridge comprises a body including first and second end surfaces which face away from one another, front and rear side surfaces which extend between the first and second end surfaces and also face away from one another, and inner and outer flank surfaces interconnecting the front and rear side surfaces and facing away from one another. An insert seat for a cutting insert is formed in the front side surface adjacent the second end surface. A slot extends completely through the body from the inner flank surface to the outer flank surface and to one of the front and rear side surfaces to divide the body into a rigid base portion and an elastically expandable portion. The base portion includes the insert seat. The expandable portion is integral with the base portion to define therewith a fulcrum about which the expandable portion is elastically expandable relative to the base portion. The expandable portion includes an abutment portion spaced from the fulcrum and from the first end surface. A hole is formed in the body for receiving a wedge to elastically expand the expandable portion and displace the abutment portion away from the base portion.

Preferably, an adjusting screw is threadedly mounted in the first end surface. The adjusting screw includes a threaded stem and an enlarged head. The head has holes extending perpendicular to an axis of rotation of the screw for receiving a turning tool.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DESCRIPTION OF A PREFERRED EMBODIMENT OF THE INVENTION

Figure 1:
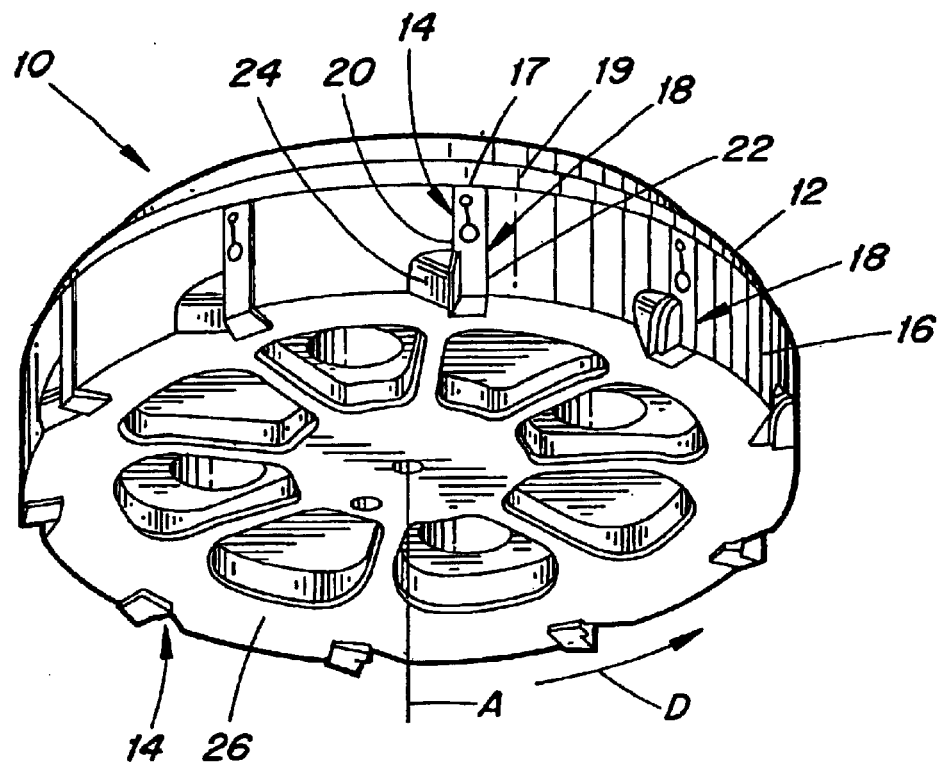
FIG. 1 is a front perspective view of a milling tool containing cartridges according to the present invention.
Figure 2:
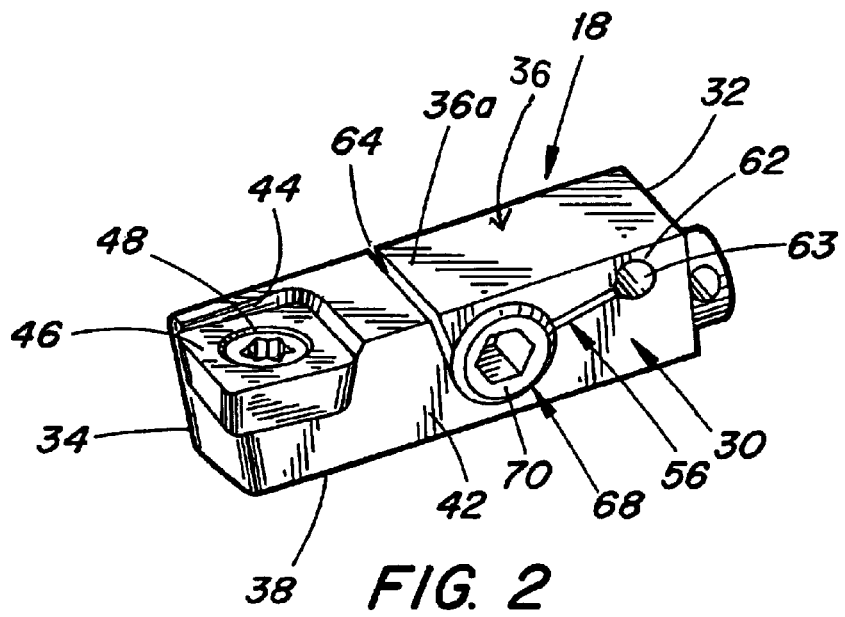
FIG. 2 is a perspective view of the cartridge, with an insert mounted therein.

Depicted in FIG. 1 is a milling cutter 10 comprising a body 12 defining a center axis of rotation A. A plurality of circumferentially spaced pockets 14 is formed in an outer peripheral surface 16 of the body 12 for receiving respective insert-carrying cartridges 18. Each pocket includes a leading wall 20 facing away from a direction of rotation D of the body, and a trailing wall 22 facing in the direction of rotation D. The leading surface includes an enlarged chip space 24 disposed at an end of the pocket which intersects a front surface of the body for receiving cuttings during a milling operation. The pocket 14 further includes an axially facing bottom surface 17 that could be formed by the body 12, but more preferably by a back-up ring 19 attached to the body.

Each cartridge 18 comprises a cartridge body 30 having first and second end surfaces 32, 34, front and rear side surfaces 36, 38 facing away from one another and interconnecting the end surfaces, and inner and outer flank surfaces 40, 42 facing away from one another and interconnecting the end surfaces 32 and 34 and also interconnecting the front and rear side surfaces 36, 38 (see FIGS. 2–5). The front side surface 36 faces toward the direction of rotation D when the cartridge 18 is installed in the body, and thus faces the leading wall 20 of the pocket. The rear side surface 38 faces the trailing wall 22 and could e provided with a serrated or dove-tailed connection with that trailing wall 22 to further secure the cartridge. The outer flank surface 42 faces generally radially outwardly with reference to the axis of rotation A when the cartridge is installed.

A recess is formed in the front side surface 36 adjacent the second end surface 34 to define an insert seat 44 for receiving a cutting insert 46. The insert 46 is retained by a fastener screw 48 which extends through a through-hole of the insert and threadably received in a threaded hole 50 (FIGS. 3 and 4) formed in the body 30.

A generally L-shaped slot 56 is formed completely through the body from the outer flank surface 42 to the inner flank surface 40. The slot 56 divides the body into a rigid base portion 58 and an elastically expandable portion 60. The base portion 58 includes the insert seat 44, whereas the expandable portion 60 is elastically flexible relative to the base portion 58 about a fulcrum 62 disposed at a first end 63 of the slot 56. The expandable portion includes an abutment portion 36a spaced from the fulcrum 62 and from the first and second end surfaces. Preferably, the abutment portion 36a is located generally midway between the first and second end surfaces 32, 34. The abutment portion 36a is defined by a part of the front side surface 36. The first slot end 63 is spaced from the first end surface 32 and from the front and rear side surfaces 36, 38.

The slot 56 includes a second end 64 which intersects the front side surface 36 at a location between the seat 44 and the first end surface 32. The first slot end 63 is situated closer to the first end surface 32 than is the second slot end 64.

Figure 3:
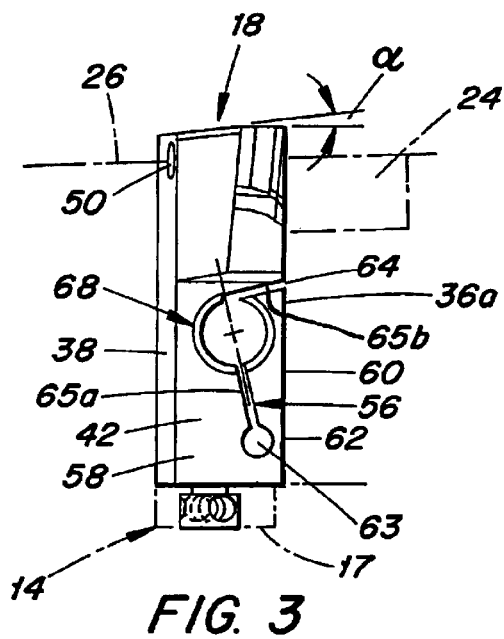
FIG. 3 is an elevational view facing an outer flank surface of the cartridge, with a portion of the milling body shown in phantom lines.
Figure 4:
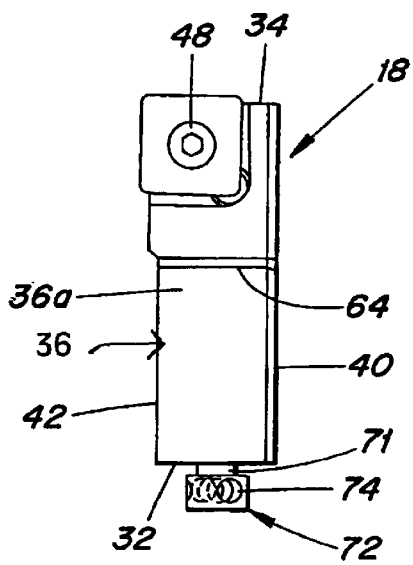
FIG. 4 is an elevational view facing a front side surface of the cartridge.
Figure 5:
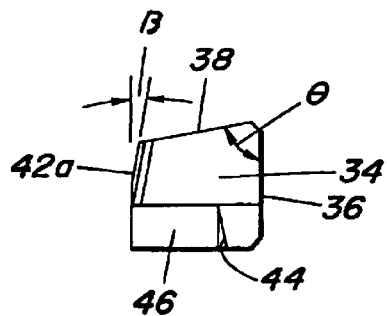
FIG. 5 is a view facing toward an end of the cartridge opposite the end where the insert is disposed.

The slot 56 includes a tapered hole 68 which extends through the slot 56 from the outer flank surface 42 to the inner flank surface 40 at a location between the slot ends 63, 64. The hole is disposed at an apex formed between two relatively angled legs 65a, 65b of the L-shaped slot, as can be seen in FIG. 3. The tapered hole 68 is screw-threaded to receive a wedge in the form of a tapered expansion screw 70 which, when rotated in one direction causes the expandable portion 60 to flex elastically away from the base portion 58, i.e., the slot 56 is widened. As a result, the abutment portion 36a of the expandable portion 60 is displaced away from the base portion and pushed against the leading wall 20 of the respective pocket 14 of the milling body 12, thereby causing the rear side surface 38 of the rigid base portion 58 to be pressed firmly against the trailing wall 22 of the pocket. The cartridge 18 is thereby held in the pocket by strong frictional forces.

By securing the cartridge in this manner, wherein the rear side surface is pressed firmly against the trailing wall 22, the insert is stabilized and is more resistant to chatter than would be the case if the cartridge were secured only at two points at its bottom end. As a consequence, the cutting insert exhibits longer life.

The expansion of the expandable portion 60 is aided by forming the first slot end 63 as a circular enlargement.

The second end surface 34 is slightly declined from the cutting insert 46, e.g., by a clearance angle ∝ of about six degrees. Likewise, a portion 42a of the outer flank surface 42 is declined from the cutting insert 46 by a clearance angle β of about ten degrees.

Figure 6:
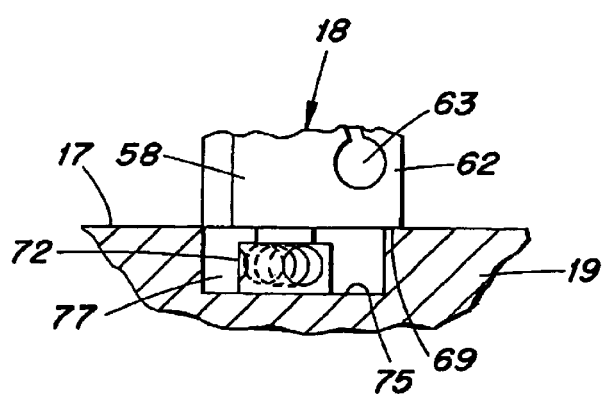
FIG. 6 is an enlarged fragmentary view showing the bottom of a cartridge mounted in a pocket of milling cutter body.

When the cartridge 18 is initially inserted into its respective pocket 14, it comes to rest on a portion 69 of the bottom surface 17 defined by the back-up ring 19 (see FIG. 6). In order to enable the cutting insert to be adjusted in a direction along the axis of rotation A, an adjusting screw 72 is provided which has a threaded stem 71 threadedly secured in the first end surface 32. The adjusting screw 72 includes a head in which a number of radial holes 74 are formed, i.e., holes extending perpendicularly to the stem 71, in order to receive a tool for rotating the adjusting screw. The head of the adjusting screw bears against the floor 75 of a recess 77 of the bottom surface 17 of the respective pocket 14 (see FIG. 3) so that as the adjusting screw 72 is unscrewed, the cartridge body 30 (and thus the cutting insert 46) will be displaced in a direction along the axis A. This can be performed without removing the cartridge from its pocket.

The rear side surface 38 is inclined at an acute angle θ (FIG. 5) relative to the inner flank surface 36. The trailing surface 22 of the pocket 14 is similarly inclined, whereby the surfaces 38, 20 do not extend radially relative to the axis A, thereby creating an undercut that resists a tendency for the cartridge 18 to be flung radially outwardly from the milling body by centrifugal force during a milling operation.

It is preferred that the slot 56 intersect the front side surface 36, so that the expandable portion pushes the cartridge against the trailing wall 22 of the pocket which is able to effectively resist the cutting forces that are directed generally toward the trailing wall. However, the slot could instead be reversed in configuration to intersect the rear side surface 38, whereby the expandable portion would push the cartridge against the leading wall 20 of the pocket. The slot could have different configurations from that which is depicted.

Instead of the hole 68 having a tapered thread, it could then have a cylindrical threaded portion which receives a cylindrical threaded portion of an expansion screw. Another portion of the screw, e.g., the head, could have a conical or other wedge shape in order to expand the expandable portion of the cartridge.

Although it is preferred that the expansion screw be threadedly attached to the cartridge, it is conceivable that the threaded hole which receives the expansion screw could instead be disposed in a radially outwardly facing wall of the pocket 14 against which the inner flank surface 40 of the cartridge abuts. In that case, the screw would be inserted through a non-threaded through-hole of the cartridge and would include a wedge portion for expanding the expandable portion. Of course, in the case of such an arrangement, the ability to adjust the cartridge in the axial direction would be restricted unless the screw-admitting hole in the cartridge were configured to allow some sort of relative movement between the cartridge and the screw along the axis.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A cartridge for a milling cutter, comprising:
   a body including first and second end surfaces facing away from one another, front and rear side surfaces extending between the end surfaces and facing away from one another, and inner and outer flank surfaces interconnecting the front and rear side surfaces and facing away from one another, an insert seat formed in the front side surface adjacent the second end surface for receiving a cutting insert;
   a slot extending completely through the body from the inner flank surface to the outer flank surface and to one of the front and rear side surfaces to divide the body into a rigid base portion and an elastically expandable portion, the base portion including the insert seat, the expandable portion being integral with the base portion to define therewith a fulcrum about which the expandable portion is elastically expandable relative to the base portion, the expandable portion including an abutment portion spaced from the fulcrum and from the first end surface, the abutment portion defined by a portion of said one of the front and rear side surfaces to which the slot extends; and a hole formed in the body for receiving a wedge to elastically expand the expandable portion and displace the abutment portion away from the base portion and away from the other of the front and rear side surfaces.

2. The cartridge according to claim 1 wherein the hole constitutes an enlarged portion of the slot.

3. The cartridge according to claim 1 wherein the hole is threaded, and further including a wedge comprising a screw received in the hole and including a wedge portion for expanding the expandable portion in response to rotation of the screw.

4. The cartridge according to claim 3 wherein the hole is tapered and the screw comprises a tapered screw.

5. The cartridge according to claim 3 wherein the hole extends completely through the body.

6. The cartridge according to claim 1 further including an adjusting screw threadedly mounted in the first end surface.

7. The cartridge according to claim 6 wherein the adjusting screw includes a threaded stem and an enlarged head, the head including holes extending perpendicular to an axis of rotation of the screw.

8. The cartridge according to claim 1 wherein the insert seat is defined by a recess formed in the front side surface.

9. The cartridge according to claim 1 wherein said one of the front and rear side surfaces to which the slot extends is constituted by the front side surface.

10. The cartridge according to claim 1 wherein the abutment surface is located generally midway between the first and second end surfaces.

11. A cartridge for a milling cutter, comprising:

a body including first and second end surfaces facing away from one another, front and rear side surfaces extending between the end surfaces and facing away from one another, and inner and outer flank surfaces interconnecting the front and rear side surfaces and facing away from one another, an insert seat formed in the front side surface adjacent the second end surface for receiving a cutting insert;

a slot extending completely through the body from the inner flank surface to the outer flank surface, the slot including first and second slot ends, the first slot end situated adjacent proximate the first end surface and spaced from the first end surface and from the front and rear side surfaces, the second slot end intersecting the front side surface at a location between the first and second end surfaces, the first slot end being situated closer to the first end surface than is the second slot end, wherein the slot divides the body into a rigid base portion and an expandable portion, the base portion including the seat section, the expandable portion being integral with the base portion and elastically deformable relative to the base portion about a fulcrum disposed at the first slot end;

a hole extending through the body and passing through the outer flank surface and through the inner flank surface; and an expansion screw threadedly mounted in the hole and including a wedge portion for elastically expanding the expandable portion away from the base portion in response to rotation of the expansion screw.

12. The cartridge according to claim 11 wherein the slot is generally L-shaped comprising first and second legs extending from the first and second slot ends respectively, wherein the threaded hole is formed in an apex between the first and second legs.

13. The cartridge according to claim 11 wherein the first slot end is defined by a generally circular enlargement.

14. The cartridge according to claim 11 wherein the second slot end is located closer to the insert seat than to the first end surface.

15. A milling tool comprising:

a holder defining an axis of rotation and including an outer peripheral surface in which circumferentially spaced pockets are formed, each pocket being elongated in a direction extending generally parallel to the axis and open in a radially outward direction, and in an axially forward direction, each pocket including a leading wall facing generally opposite a direction of rotation, a trailing wall facing generally toward the direction of rotation and a bottom surface facing in an axial forward direction;

a plurality of cartridges mounted in respective pockets, each cartridge comprising a body which includes:

first and second end surfaces facing away from one another, the first end surface facing the bottom wall of the pocket, front and rear side surfaces extending between the first and second end surfaces and facing away from one another, wherein the front side surface faces the leading wall, and the rear side surface faces the trailing wall, and inner and outer flank surfaces interconnecting the front and rear side surfaces and facing away from one another wherein the outer wall faces radially outwardly, the cartridge body forming an insert seat adjacent the second end surface for receiving a cutting insert, a slot extending completely through the body from the inner flank surface to the outer flank surface, the slot including first and second slot ends, the first slot end situated adjacent to the first end surface and spaced from the first end surface and the front and rear side surfaces, the second slot end intersecting one of the front and rear side surfaces at a location between the insert seat and the first end surface, wherein the slot divides the body into a rigid base portion and an elastically expandable portion elastically deformable relative to the base portion about a fulcrum disposed proximate the first slot end, a hole formed in the body, and an expansion screw threadedly mounted in the hole and including a wedge portion, the screw being rotatable in one direction to enable the wedge portion to elastically expand the expandable portion away from the base portion and away from the other of the front and rear side surfaces and into contact with a respective one of the leading and trailing walls of the pocket to push the base portion into tight frictional contact with the other of the leading and trailing walls, respectively.

16. The milling tool according to claim 15 wherein said one of the front and rear side surfaces intersected by the slot is the front side surface, wherein expansion of the expansion portion causes the rear side surface to be pressed firmly against the trailing wall of the pocket.

17. The milling tool according to claim 15 wherein the holder further includes chip openings formed in the periph-

18. The milling tool according to claim 15 wherein the cartridge further includes an adjusting screw having a shank threadedly mounted in the first end surface, and a head engaging the bottom surface of the pocket to adjust the cartridge along the axis of rotation in response to rotation of the adjusting screw.

19. The milling tool according to claim 18 wherein the head includes holes extending perpendicularly to the axis of rotation for receiving a turning tool for rotating the adjusting screw.

* * * * *